(12) United States Patent
Motoyama

(10) Patent No.: US 8,773,739 B2
(45) Date of Patent: Jul. 8, 2014

(54) IMAGE READING DEVICE CAPABLE OF READING SKEW SHEET WITHOUT IMAGE LOSS

(75) Inventor: Toshiki Motoyama, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 33 days.

(21) Appl. No.: 13/619,004

(22) Filed: Sep. 14, 2012

(65) Prior Publication Data
US 2013/0083366 A1   Apr. 4, 2013

(30) Foreign Application Priority Data
Sep. 30, 2011   (JP) .................................. 2011-216254

(51) Int. Cl.
*H04N 1/04*   (2006.01)
(52) U.S. Cl.
USPC ............ 358/498; 358/474; 358/488; 399/15; 399/16; 399/394; 399/395; 382/289; 382/290; 382/293; 382/296
(58) Field of Classification Search
USPC .................................. 382/289–290, 293, 296
See application file for complete search history.

(56) References Cited

U.S. PATENT DOCUMENTS

| | | | | |
|---|---|---|---|---|
| 5,172,907 A * | 12/1992 | Kalisiak | ........................ | 271/227 |
| 5,442,431 A * | 8/1995 | Fujimoto et al. | .............. | 399/367 |
| 5,678,815 A | 10/1997 | Sheng | | |
| 6,493,113 B1 * | 12/2002 | Fujii et al. | ..................... | 358/488 |
| 6,888,650 B1 | 5/2005 | Mizubata et al. | | |
| 6,901,237 B2 * | 5/2005 | Nakamura | ..................... | 399/367 |
| 7,866,664 B2 * | 1/2011 | Kao | ............................... | 271/227 |
| 8,020,861 B2 * | 9/2011 | Itabashi et al. | ............ | 271/258.01 |
| 8,077,349 B2 * | 12/2011 | Matsuda et al. | ................ | 358/1.9 |
| 8,203,767 B2 * | 6/2012 | Kitazawa et al. | .............. | 358/498 |
| 8,248,658 B2 * | 8/2012 | Morgan | ......................... | 358/2.1 |
| 8,428,505 B2 * | 4/2013 | Udagawa | ...................... | 399/388 |
| 8,444,135 B2 * | 5/2013 | Morita et al. | ................. | 271/3.17 |

(Continued)

FOREIGN PATENT DOCUMENTS

| | | |
|---|---|---|
| JP | H05-183691 A | 7/1993 |
| JP | H09-27888 A | 1/1997 |

(Continued)

OTHER PUBLICATIONS

Japan Patent Office, Office Action for Japanese Patent Application No. 2011-216255 (counterpart to above-captioned patent application), mailed Sep. 10, 2013.

*Primary Examiner* — Dung Tran
(74) *Attorney, Agent, or Firm* — Baker Botts L.L.P.

(57) ABSTRACT

An image reading device includes a conveying unit, reading unit, detecting unit, and control unit. The conveying unit conveys two sheets of the original one by one. The reading unit reads a sheet passing past a reading position. The detecting unit detects a sheet passing past a detection position upstream of the reading position in a conveying direction. The control unit controls the reading unit to start a reading process when a leading edge of sheet reaching a position upstream of the reading position by a first distance, controls the reading unit to stop the reading process when a trailing edge of sheet reaching a position downstream of the reading position by a second distance, determines an interspace between the trailing edge of sheet and a leading edge of a subsequently-conveyed sheet, and updates the first distance and the second distance based on the interspace.

6 Claims, 12 Drawing Sheets

(56) References Cited

U.S. PATENT DOCUMENTS

| | | | | |
|---|---|---|---|---|
| 8,482,809 B2 | * | 7/2013 | Mikami | 358/406 |
| 8,494,431 B2 | * | 7/2013 | deJong et al. | 399/395 |
| 2011/0052292 A1 | * | 3/2011 | Prabhat | 399/395 |
| 2013/0082440 A1 | | 4/2013 | Fujiwara | |

FOREIGN PATENT DOCUMENTS

| | | |
|---|---|---|
| JP | 2000-295434 A | 10/2000 |
| JP | 2001-142263 A | 5/2001 |
| JP | 2004-214834 A | 7/2004 |
| JP | 2004-224500 A | 8/2004 |
| JP | 2005-136767 A | 5/2005 |
| JP | 2006-067329 A | 3/2006 |
| JP | 2006-165857 A | 6/2006 |
| JP | 2006-311293 A | 11/2006 |
| JP | 2008-011363 A | 1/2008 |
| JP | 2009-260998 A | 11/2009 |
| JP | 2010-050800 A | 3/2010 |

* cited by examiner

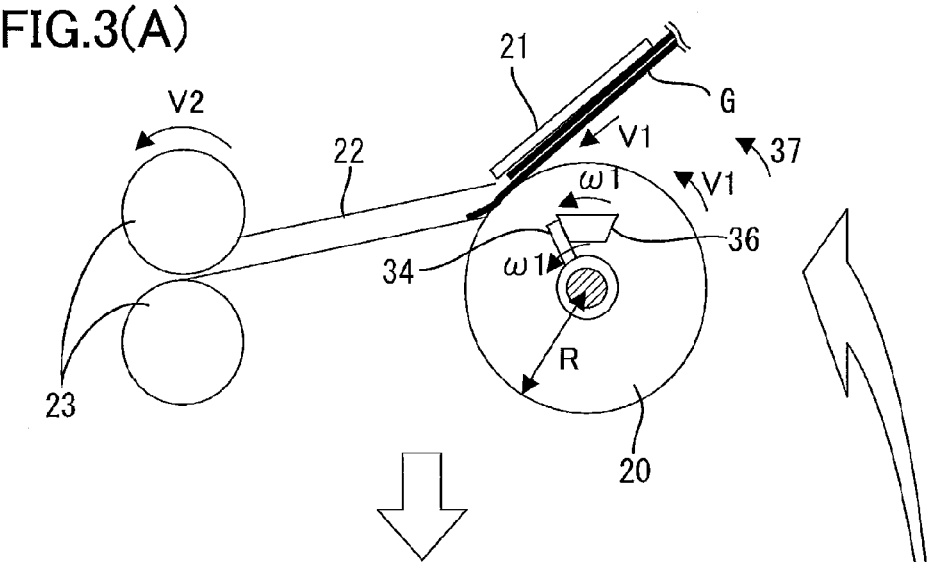
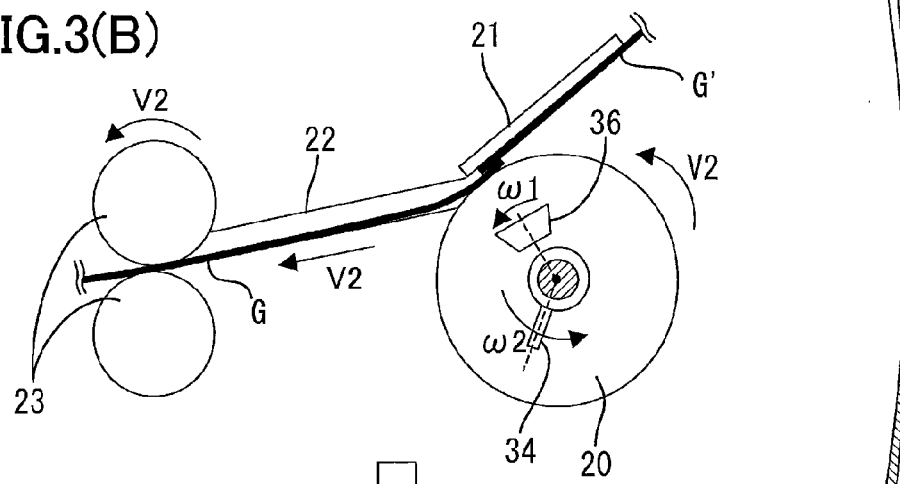
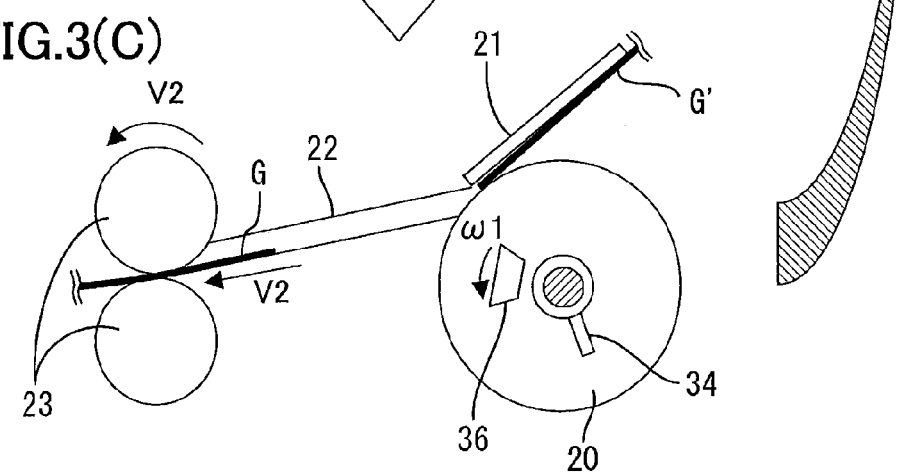

IMAGE READING DEVICE CAPABLE OF READING SKEW SHEET WITHOUT IMAGE LOSS

CROSS REFERENCE TO RELATED APPLICATION

This application claims priority from Japanese Patent Application No. 2011-216254 filed Sep. 30, 2011. The entire content of the priority application is incorporated herein by reference.

TECHNICAL FIELD

The present invention relates to an image reading device for continuously conveying and reading a plurality of sheets of an original.

BACKGROUND

An image reading device known in the art is capable of reading a plurality of sheets of an original while conveying the sheets continuously. Sometimes the sheets of the original are conveyed in a skewed state. In order to read the sheets of the original that are skewed without losing portions of the image, the conventional device sets a larger scanning region than the size of the original in the conveying direction and the like, requiring the device to read the original within this scanning region.

SUMMARY

Sometimes the size of the original loaded in the image reading device is not known prior to a scanning operation. In such cases, expanded portions of the scanning region cannot be determined from the size of original. In order to read an original without image loss, therefore, it is necessary to set the expanded portions of the scanning region to a relatively large size. For example, the size of the expanded portions could be set based on the maximum size of an original that the image reading device can scan. However, when the expanded portion of the scanning region is set relatively large, there is a chance that scanning regions for consecutively conveyed sheets of the original will overlap, resulting in image loss.

In view of the foregoing, it is an object of the invention to provide a technology for preventing image loss when scanning a sheet of an original with an image reading device.

In order to attain the above and other objects, the invention provides an image reading device including a conveying unit, a reading unit, a detecting unit, and a control unit. The conveying unit is configured to convey a plurality of sheets one by one along a conveying path in a conveying direction. The conveying path has a reading position and a detection position upstream of the reading position in the conveying direction. Each of the plurality of sheets has a leading edge and a trailing edge. The reading unit is configured to read a sheet passing past the reading position. Read data is acquired by the reading unit. The detecting unit is configured to detect a sheet passing past the detection position. The control unit is configured to control, based on a detection result of the detecting unit, the reading unit to start reading a sheet when the leading edge of the sheet reaches a position upstream of the reading position in the conveying direction by a first distance. The control unit is further configured to control, based on the detection result of the detecting unit, the reading unit to stop reading the sheet when the trailing edge of the sheet reaches a position downstream of the reading position in the conveying direction by a second distance. The control unit is further configured to determine an interspace between the trailing edge of the sheet and a leading edge of a subsequently-conveyed sheet that is conveyed subsequently to the sheet. The control unit is further configured to update the first distance and the second distance based on the interspace.

BRIEF DESCRIPTION OF THE DRAWINGS

The particular features and advantages of the invention as well as other objects will become apparent from the following description taken in connection with the accompanying drawings, in which:

FIGS. 3 (A)-(C) are schematic diagrams illustrating a sheet feeding process between the feeding roller and a conveying roller provided in the image reading device according to the embodiment;

DETAILED DESCRIPTION

Next, a preferred embodiment will be described while referring to FIGS. 1 through 14.

1. Mechanical Structure of an Image Reading Device

The image reading device 1 includes a sheet tray 2, a main body 3, and a discharge tray 4. The image reading device 1 is a sheet-fed scanner that conveys a plurality of sheets G of an original stacked on the sheet tray 2 to the discharge tray 4 while reading the conveyed sheets G using a contact image sensor (CIS) 24 provided in the main body 3.

Figure 1:
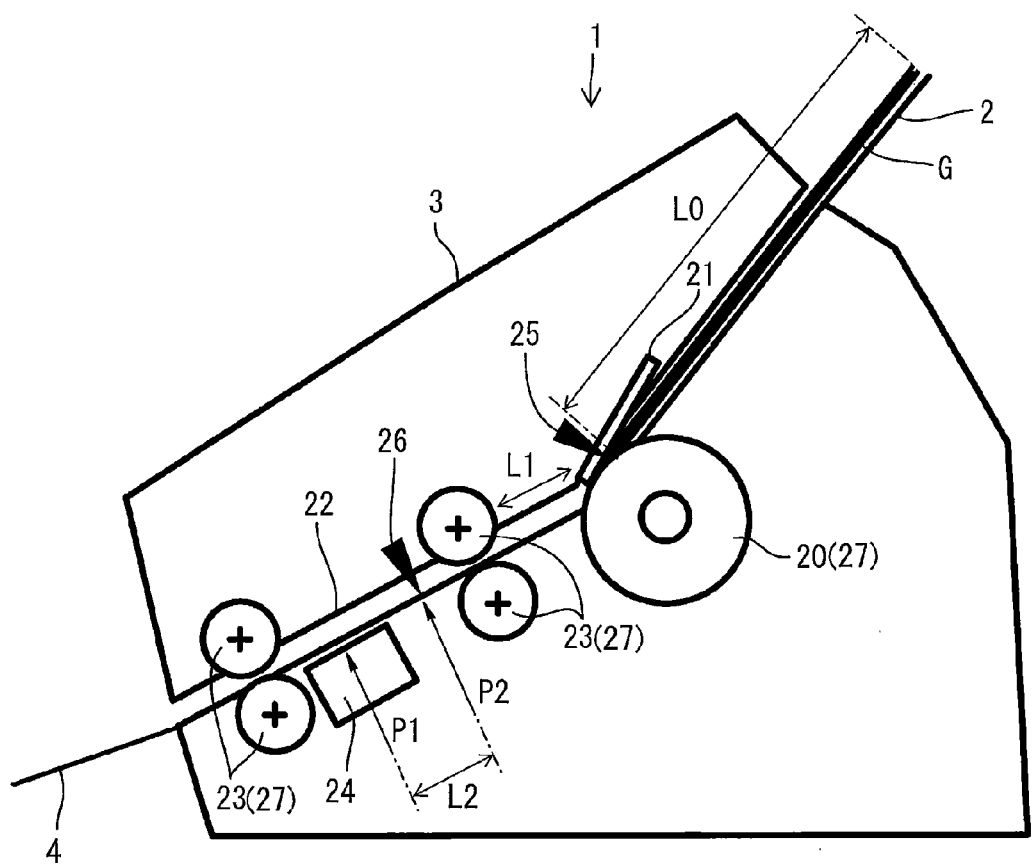
FIG. 1 is a schematic cross-sectional view showing a general structure of an image reading device according to a preferred embodiment of the present invention.

As shown in FIG. 1, the main body 3 defines a paper-conveying path 22 linking the sheet tray 2 to the discharge tray 4. The paper-conveying path 22 has an ambient portion provided with a feeding roller 20, a separating pad 21, pairs of conveying rollers 23, the CIS 24, a front sensor 25, and a rear sensor 26.

The feeding roller 20 contacts the sheets G set in the sheet tray 2. When the feeding roller 20 rotates, friction is generated between the feeding roller 20 and the sheets G, by which friction the feeding roller 20 feeds the sheets G into the main body 3. The separating pad 21 applies a frictional force to the sheets G in order that the feeding roller 20 can separate one sheet G from the plurality of sheets (i.e., in order to prevent multiple sheets G from being fed simultaneously). Hence, these components separate the sheets G loaded in the sheet tray 2 in order that one sheet is fed at a time into the main body 3.

The image reading device 1 further includes a motor (not shown) for driving the conveying rollers 23 to rotate. When driven, the conveying rollers 23 convey the sheets G that have been fed into the main body 3 along the paper-conveying path 22 in a conveying direction D2. The CIS 24 is disposed on the paper-conveying path 22 at a reading position P1 and reads scans the sheets G passing past the reading position P1.

The conveying rollers 23 convey the sheets G along the paper-conveying path 22 to the discharge tray 4, and the sheets G are received in a stack on the discharge tray 4. Hence, the feeding roller 20 and the conveying rollers 23 constitute a conveying unit 27 that continuously conveys the sheets G loaded in the sheet tray 2 one by one along the paper-conveying path 22 in the conveying direction D2.

The front sensor 25 is disposed on the sheet tray 2 and is configured to be on when a sheet G of the original is loaded in the sheet tray 2 and to be off when an original sheet G is not present in the sheet tray 2. The rear sensor 26 is disposed at a detection position P2 upstream of the CIS 24 (the reading position P1) in the conveying direction D2. The rear sensor 26 is configured to be on as a sheet G of the original passes past the detection position P2 along the paper-conveying path 22 and to be off when a sheet G of the original is not present at the detection position P2. The main body 3 is additionally provided with an input unit 5 and a display unit 6 (see FIG. 5). The input unit 5 includes a power switch, and various buttons that receive operations and commands from the user. The display unit 6 is configured of an LED screen for displaying in the case of an LED screen the status of the image reading device 1.

2. Mechanical Structure of the Feeding Roller

Figure 2:
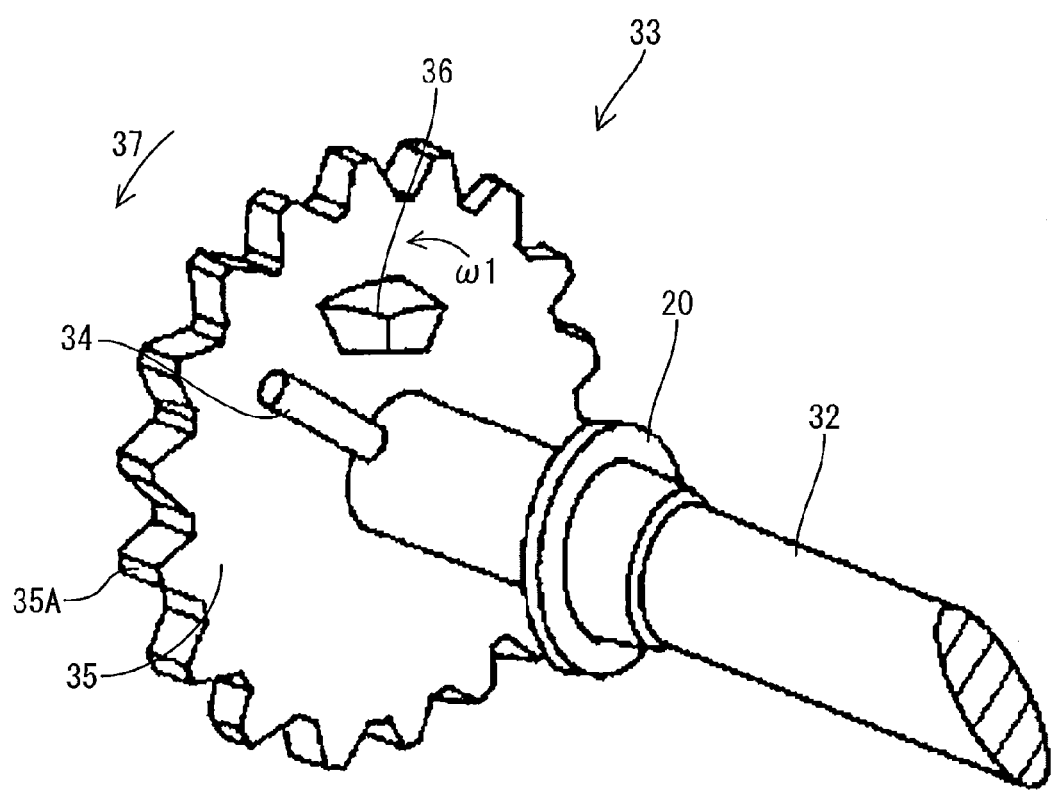
FIG. 2 is a schematic perspective view showing a general structure of a feeding roller provided in the image reading device according to the embodiment.

A clutch mechanism 33 of the feeding roller 20 is shown in FIG. 2. The feeding roller 20 has a feeding roller shaft 32 inserted therethrough, and can rotate about the feeding roller shaft 32. A pin 34 is fixed to the feeding roller 20 and protrudes outward in a radial direction of the feeding roller shaft 32. In other words, the pin 34 is fixed to the feeding roller 20 and rotates around the feeding roller shaft 32 together with the rotation of the feeding roller 20.

A drive gear 35 is disposed adjacent to the pin 34. The feeding roller shaft 32 is inserted through the drive gear 35 so that the drive gear 35 freely rotates around the feeding roller shaft 32. The drive gear 35 includes a gear part 35A having teeth formed around its outer periphery. An external gear (not shown) engaged with the gear part 35A applies a drive force to the gear part 35A for rotating the same at a first angular velocity $\omega 1$ around the feeding roller shaft 32 in the direction indicated by an arrow 37 in FIG. 2.

The drive gear 35A has a side surface provided with a protrusion 36 adjacent to the pin 34. The protrusion 36 is formed integrally with the drive gear 35 and rotates about the feeding roller shaft 32 together with the drive gear 35. The protrusion 36 is disposed so as to contact the pin 34 when the drive gear 35 is driven to rotate around the feeding roller shaft 32. The pin 34 and the protrusion 36 are capable of engaging with and separating from each other. Therefore, the feeding roller 20 and the drive gear 35 rotate together about the feeding roller shaft 32 when the pin 34 and the protrusion 36 are engaged and rotate separately about the feeding roller shaft 32 when the pin 34 and the protrusion 36 are separated.

3. Rotational Operation of the Feeding Roller

The drive gear 35 has been omitted from FIGS. 3(A)-3(C), with only the protrusion 36 depicted. As shown in FIG. 3(A), when the image reading device 1 first begins conveying the sheet G, the drive gear 35 is rotated at the first angular velocity $\omega 1$. The pin 34 is engaged and pressed by the protrusion 36 in the rotational direction 37 so that the feeding roller 20 also rotates at the first angular velocity $\omega 1$. As a result, the sheet G contacted by the feeding roller 20 is conveyed into the paper-conveying path 22 at a feeding velocity V1. The first angular velocity $\omega 1$ and the feeding velocity V1 have the following relationship, where R stands for the radius of the feeding roller 20.

$$V1 = R \times \omega 1$$

When the leading edge of a sheet G of the original conveyed by the feeding roller 20 arrives at the conveying rollers 23, as shown in FIG. 3(B), the conveying rollers 23 begin conveying the sheet G at a conveying velocity V2, which is greater than the feeding velocity V1. Consequently, the feeding roller 20 contacting the sheet G is also rotated at the conveying velocity V2. At this time, the pin 34 begins rotating at a second angular velocity $\omega 2$ faster than the first angular velocity $\omega 1$ and then separates from the protrusion 36 rotating at the first angular velocity $\omega 1$. Upon separating the trailing edge of the sheet G from the feeding roller 20, an angle $\theta$ is produced between the pin 34 and the protrusion 36. The angle $\theta$ can be calculated from the following equation, where L0 stands for the length of the sheet G in the conveying direction D2 and L1 stands for the distance along the paper-conveying path 22 between the feeding roller 20 and the conveying rollers 23.

$$V2 > V1, V2 = R \times \omega 2$$
$$\theta = (\omega 2 - \omega 1) \times \frac{(L0 - L1)}{V2}$$

As the conveying rollers 23 continue conveying the sheet G, the trailing edge of the sheet has separated from the feeding roller 20, as shown in FIG. 3(C), and the feeding roller 20 has ceased to rotate. In the meantime, the drive gear 35 continues to rotate idly at the first angular velocity $\omega 1$ until the drive gear 35 has rotated the angle $\theta$ that was produced at the moment the feeding roller 20 came to a stop. Hence, the angle $\theta$ can be considered an idling angle over which the drive gear 35 rotates idly while the feeding roller 20 is halted. After the drive gear 35 rotates the angle $\theta$, the protrusion 36 on the drive gear 35 once again engages the pin 34 and begins conveying the next sheet G' of the original, as shown in FIG. 3(A). An interspace (gap) Z formed between the trailing edge of the sheet G and the leading edge of the next sheet G' in the conveying direction D2 when the feeding roller 20 begins conveying the next sheet G' is represented by the following equation.

$$Z = V2 \times \frac{\theta}{\omega 1} = (\omega 2 - \omega 1) \times \frac{(L0 - L1)}{\omega 1}$$

Figure 4:
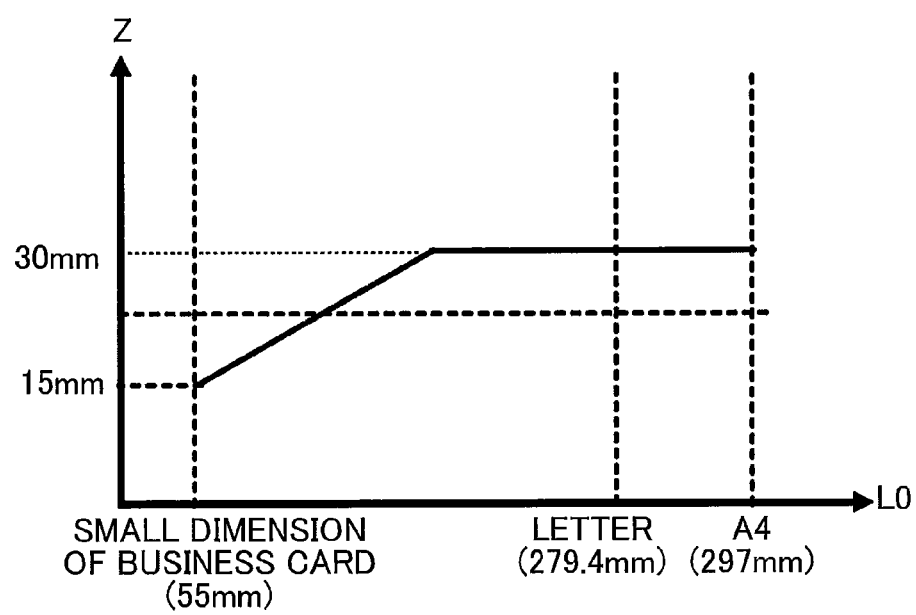
FIG. 4 is a graph showing a relationship between a size of original and an interspace between sheets in the embodiment.

In the preferred embodiment, the image reading device 1 is capable of setting the interspace Z between two sheets of the original based on a size L0 of the original and proportional to the distance (L0–L1). As shown in FIG. 4, as the size L0 increases from 55 mm, which is the small dimension of a business card, the image reading device 1 increases the interspace Z from 15 mm up to a maximum of 30 mm. The idling angle θ is approximately 360 degrees when the interspace Z is 30 mm. Therefore, the image reading device 1 maintains the interspace Z is fixed at 30 mm, even as the size L0 grows larger. Thus, the image reading device 1 can set the interspace Z between two sheets of the original based on the size L0 and the difference between the feeding velocity V1 and the conveying velocity V2. To achieve this, a CPU 11 described later need not identify the size L0 in order to set the interspace Z prior to conveying the original sheet G.

4. Electrical Structure of the Image Reading Device

Figure 5:
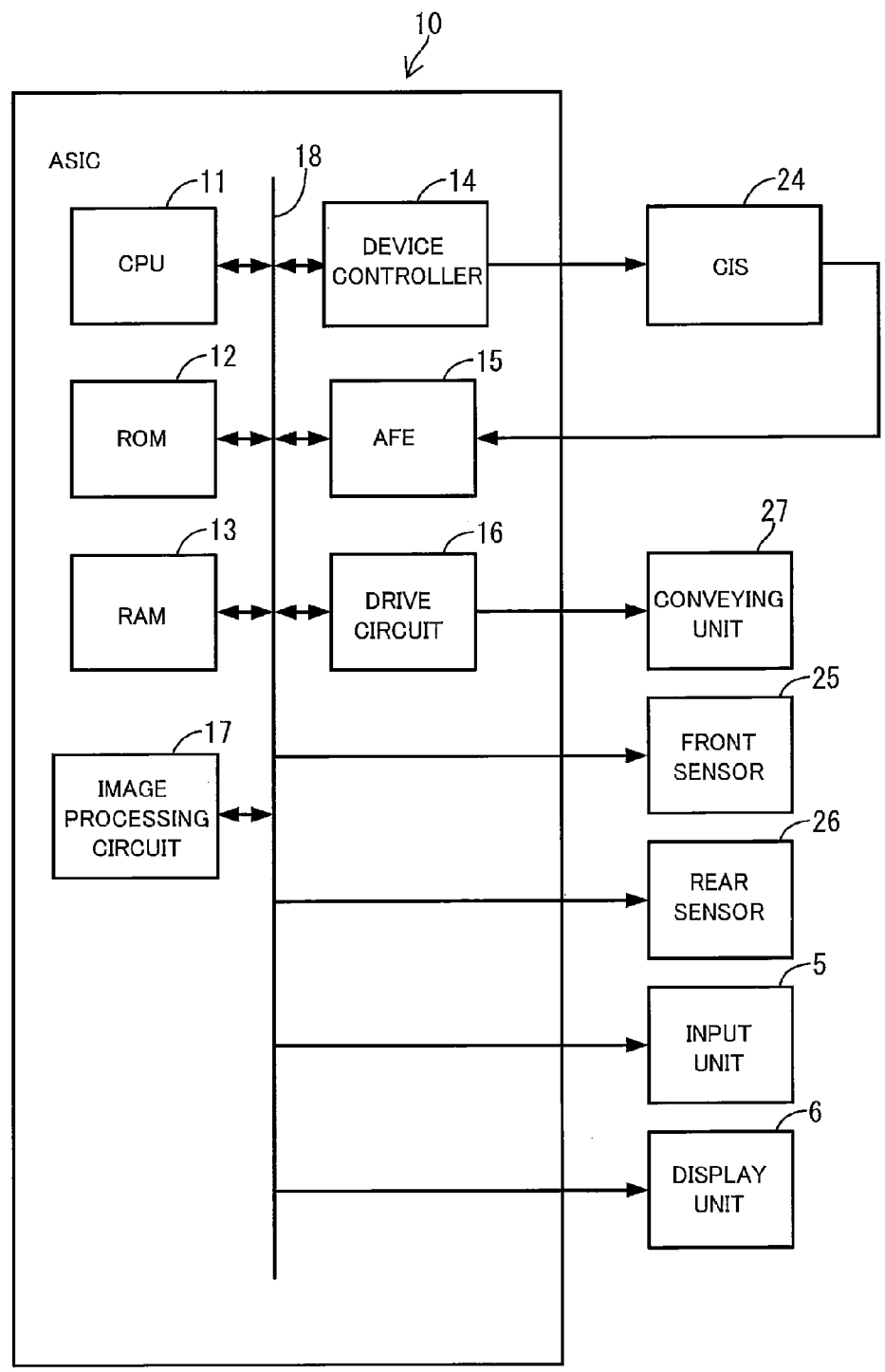
FIG. 5 is a schematic block diagram showing an electrical configuration of the image reading device according to the embodiment.
Figure 6:
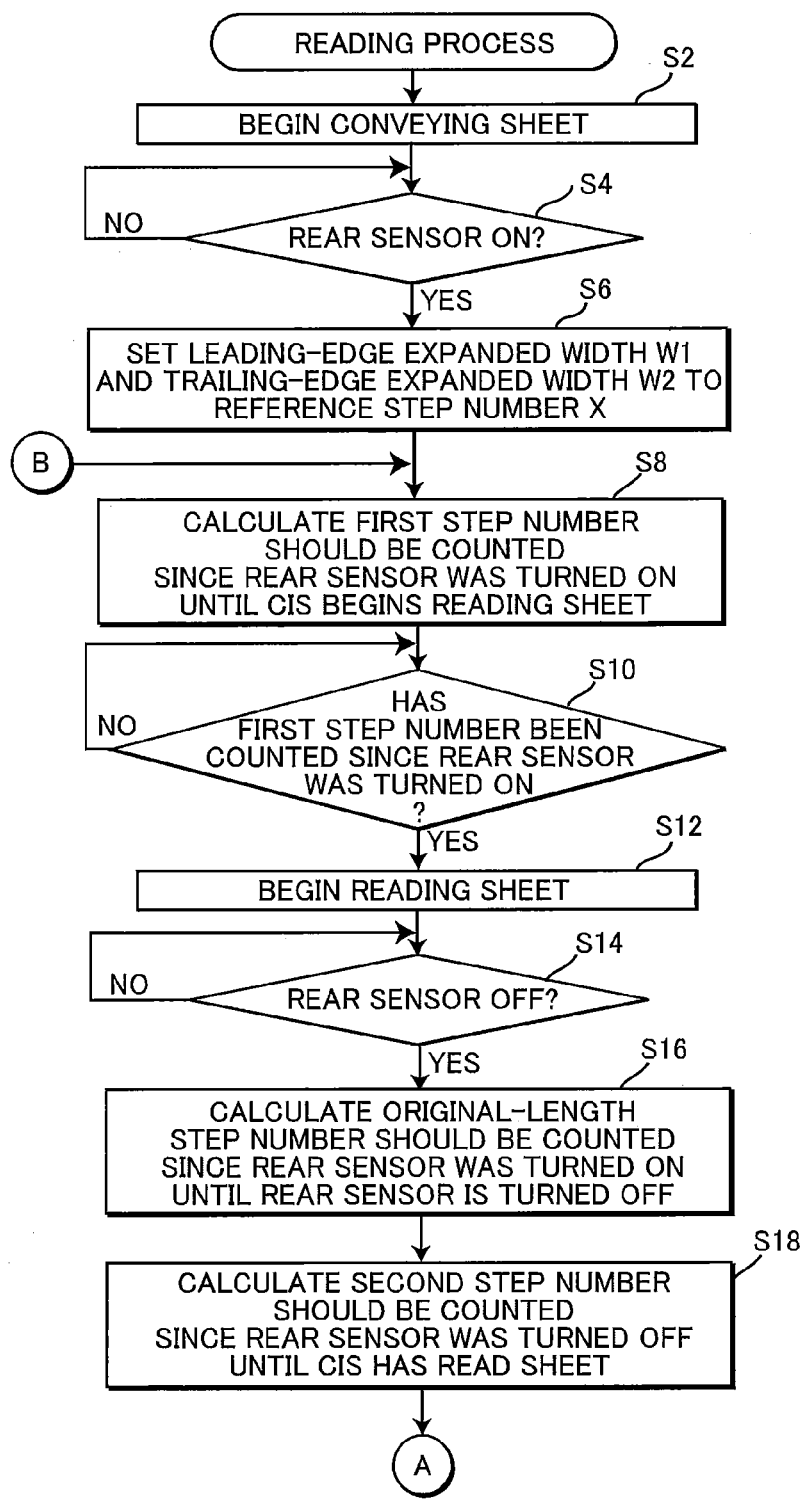
FIGS. 6-8 are flowcharts showing a reading process executed by the image reading device according to the embodiment.

As shown in FIG. 5, the image reading device 1 includes an application-specific integrated circuit (ASIC) 10 that controls the components of the image reading device 1. The ASIC 10 includes the central processing unit (CPU) 11, a ROM 12, a RAM 13, a device controller 14, an analog frontend (AFE) 15, a drive circuit 16, and an image-processing circuit 17. The front sensor 25, rear sensor 26, and the like are connected to these components via a bus 18.

The ROM 12 stores various programs for controlling operations of the image reading device 1. The CPU 11 controls the components of the image reading device 1 based on programs read from the ROM 12. The device controller 14 is connected to the CIS 24 and transmits signals to the CIS 24 for controlling a scanning operation based on commands received from the CPU 11. The CIS 24 reads the sheet G over a scanning region H (see FIG. 10) based on the signals received from the device controller 14 and outputs the scan data to the AFE 15.

The AFE 15 is connected to the CIS 24 and functions to convert scan data outputted from the CIS 24 as an analog signal into gradation data as a digital signal based on commands from the CPU 11. The AFE 15 stores the scan data and gradation data in the RAM 13 via the bus 18. The image-processing circuit 17 performs a skew correction process on the gradation data stored in the AFE 15 to produce corrected data.

The drive circuit 16 is connected to the conveying unit 27 and transmits a pulse signal to the conveying unit 27 in response to commands from the CPU 11. The conveying unit 27 includes a stepping motor (not shown). The drive circuit 16 drives the stepping motor to rotate a prescribed angle, which will be considered "one step," for each pulse in the pulse signal. When the stepping motor is driven one step worth, the conveying rollers 23 are driven to convey the sheet G exactly a prescribed distance along the paper-conveying path 22.

5. Reading Process

Next, a process performed by the CPU 11 for using the CIS 24 to read a sheet G of the original will be described with reference to FIGS. 6 through 14.

The CPU 11 begins the reading process after confirming the front sensor 25 that a sheet G of the original is set in the sheet tray 2 and after a read command for reading the sheet G has been inputted on the input unit 5.

In S2 at the beginning of the reading process, the CPU 11 controls the drive circuit 16 to transmit a pulse signal to the conveying unit 27 (the conveying roller 23) and begins counting the number of steps as the conveying unit 27 begins conveying a sheet G of the original. In S4 the CPU 11 monitors the position of the sheet G being conveyed with the rear sensor 26. Specifically, the CPU 11 determines whether the rear sensor 26 has turned on (i.e., whether the rear sensor 26 has detected the sheet G) and continually repeats this determination while the rear sensor 26 remains off (S4: NO). When the rear sensor 26 is on (S4: YES), in S6 the CPU 11 sets both a leading-edge expanded width W1 and a trailing-edge expanded width W2 to a distance corresponding to a reference step number X.

Figure 10:
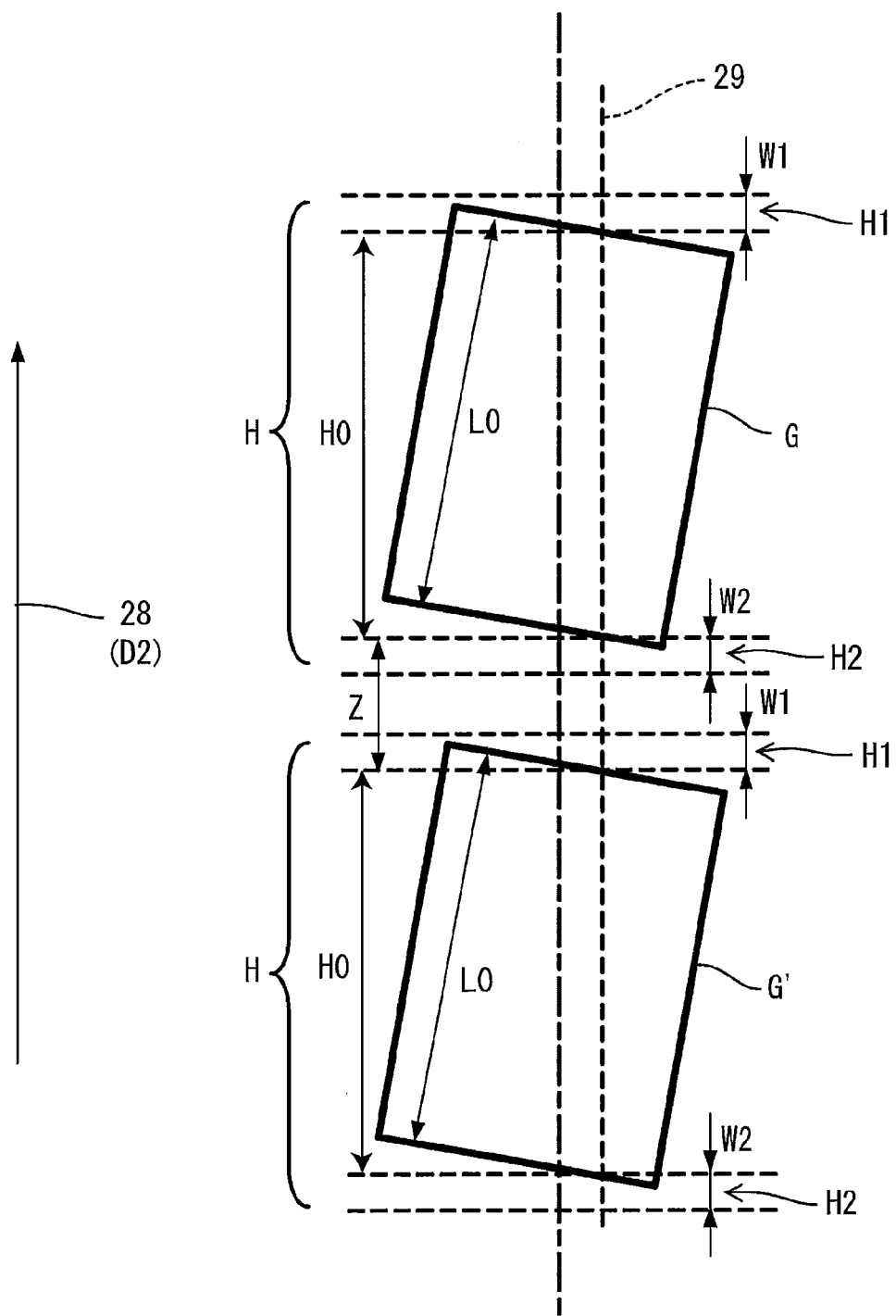
FIG. 10 is a schematic diagram explaining a scanning region and sheets of the original conveyed continuously when an interspace between the sheets is longer than twice a reference length.

As shown in FIG. 10, the leading edge expanded width W1 denotes the width in the conveying direction D2 (indicated by an arrow 28) of a region H1 within the scanning region (reading region) H. The region H1 is a region that the CIS 24 reads prior to the leading edge of the sheet G arriving at the reading position P1. As will be described later, a trailing edge expanded width W2 denotes the width in the conveying direction D2 of a region H2 within the scanning region H. The region H2 is a region that the CIS 24 continues to read after the trailing edge of the sheet G has passed over the reading position P1.

The leading edge expanded width W1, the trailing edge expanded width W2, and the interspace Z between the sheets of the original are set based on a rear sensor axis 29 (FIG. 10) along which the rear sensor 26 detects the sheets G. By including the regions H1 and H2 in the scanning region H in addition to a region H0 corresponding to the size L0, the CPU 11 can control the CIS 24 to read the sheet G without image loss, even when the sheet G being conveyed is skewed relative to the conveying direction D2, as in the example of FIG. 10.

The CPU 11 sets the reference step number X based on the distance required to perform a skew correction process on read data of the maximum size of the original using the image-processing circuit 17. The reference step number X is determined based on the maximum size of the size L0 that the image reading device 1 can convey, as well as the maximum allowable skew in the sheet G and the like.

In S8 the CPU 11 calculates a first step number denoting the number of steps that the stepping motor will rotate after the rear sensor 26 was turned on until the CIS 24 begins reading the sheet G. The first step number is calculated by subtracting the step number corresponding to the leading-edge expanded width W1 from the step number corresponding to the distance L2 along the paper-conveying path 22 from the detection position P2 to the reading position P1. In S10 the CPU 11 waits until the first step number has been counted after the rear sensor 26 was turned on. In other words, the CPU 11 continually repeats the determination in S10 while the first step number has not been counted (S10: NO). When the first step number has been counted (S10: YES), in S12 the CPU 11 controls the CIS 24 to begin reading the sheet G. That is, the CPU 11 controls the CIS 24 to start reading the sheet G when the leading edge of the sheet G arrives at a position upstream of the reading position P1 in the conveying direction D2 by the leading-edge expanded width W1.

After initiating the reading operation, in S14 the CPU 11 waits until the sheet G passes the detection position P2 and the rear sensor 26 turns off. In other words, the CPU 11 continually repeats the determination in S14 while the rear sensor 26 is on (S14: NO). When the rear sensor 26 turns off (S14: YES), in S16 the CPU 11 calculates the step number from the moment that the rear sensor 26 turned on to the moment that the rear sensor 26 turned off, corresponding to the length of the sheet G, and stores this step number in the RAM 13. Thus, this step number denotes a step number equivalent to the size L0 (hereinafter referred to as the "original-length step number"). In S18 the CPU 11 calculates a second step number denoting the number of steps that the stepping motor will rotate after the rear sensor 26 turned off until the reading operation will end. The second step number is found by adding the step number corresponding to the distance L2 to the step number corresponding to the trailing-edge expanded width W2.

Figure 7:
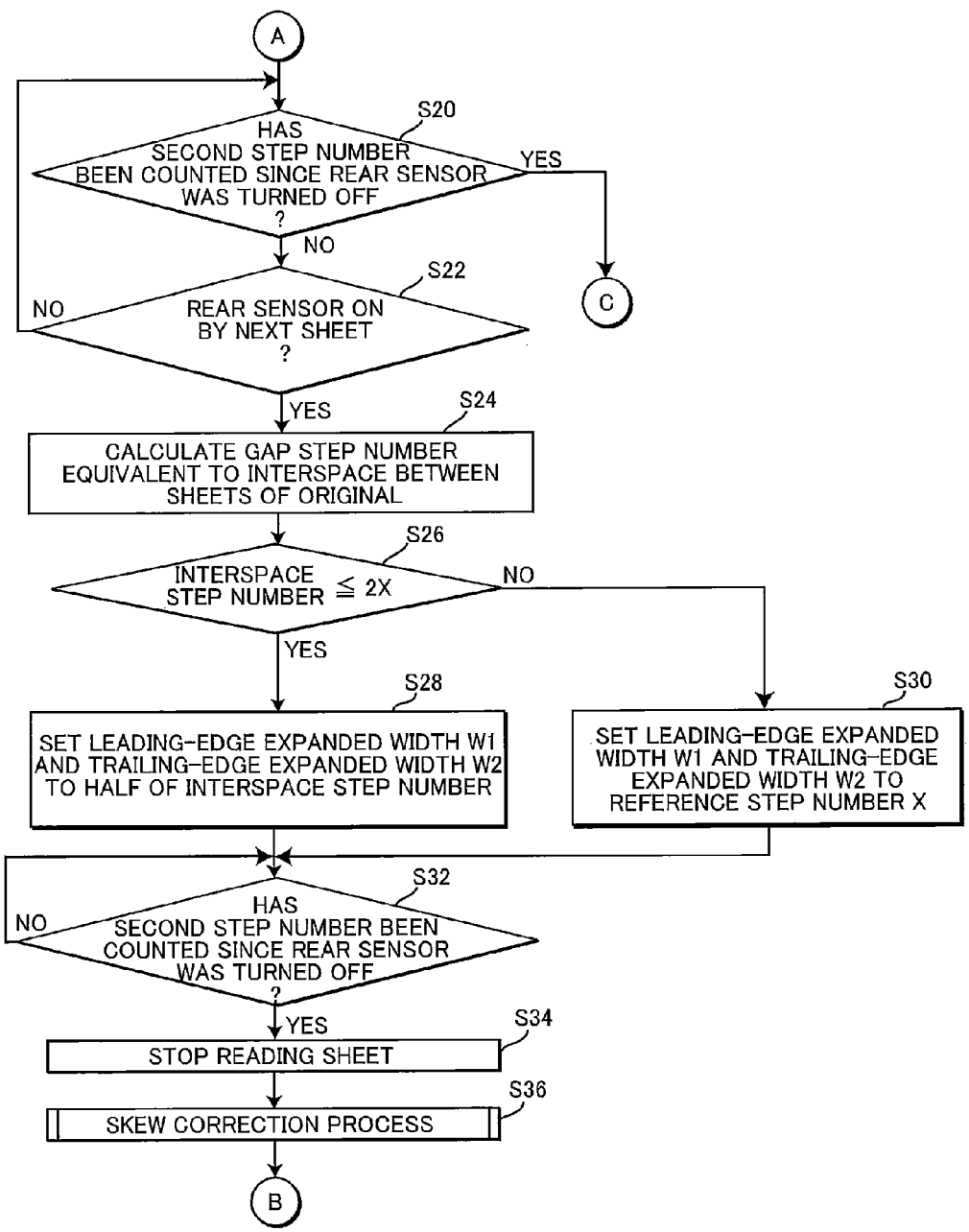
Figure 8:
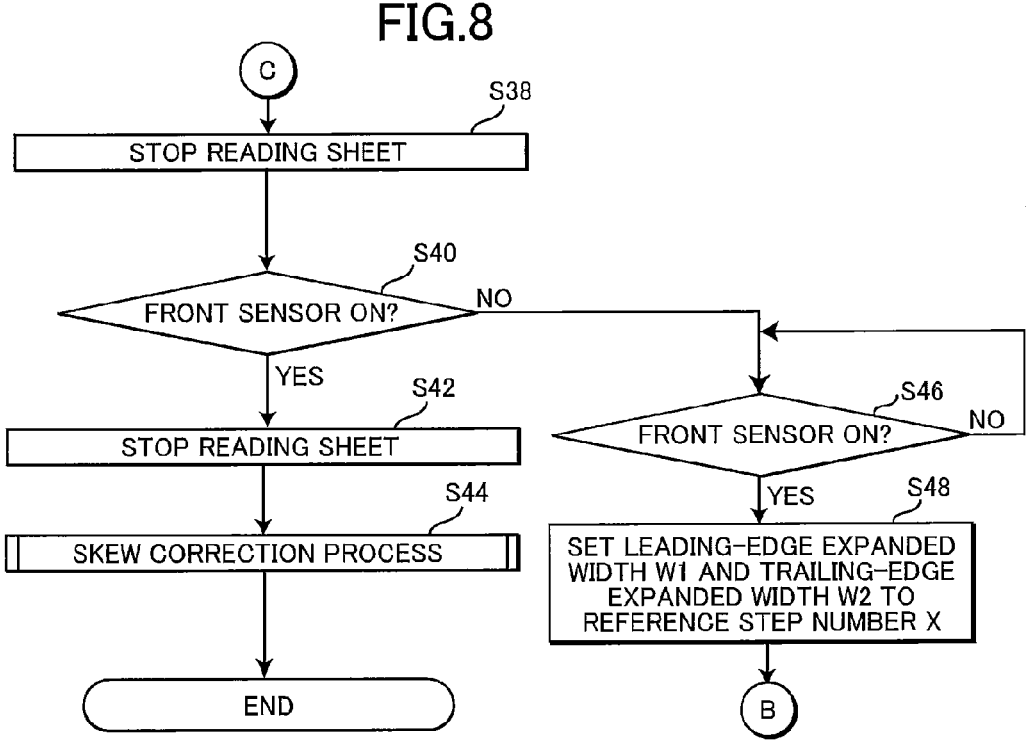

In S20 and S22 of FIG. 7, the CPU 11 counts the elapsed number of steps while monitoring the rear sensor 26 to determine whether the second step count has elapsed after the rear sensor 26 turned off (S20) and whether the rear sensor 26 was turned back on by the next sheet G of the original (S22). In other words, the CPU 11 determines which event occurs first. If the second step number is counted before the rear sensor 26 turns back on (S20: YES, S22: NO) as in the situation shown in FIG. 13, in S38 of FIG. 8 the CPU 11 stops reading the sheet G. In other words, the CPU 11 controls the CIS 24 to stop reading the sheet G based on the detection result of the rear sensor 26 when the trailing edge of the sheet G reaches a position downstream of the reading position P1 in the conveying direction D2 by the trailing-edge expanded width W2. In S40 the CPU 11 determines whether the front sensor 25 is on. If the front sensor 25 is off (S40: NO), the CPU 11 determines that there are no more unprocessed sheets G remaining in the paper tray 2 and in S42 halts conveyance of the sheet G. In S44 the CPU 11 executes a skew correction process on the gradation data acquired above and subsequently ends the reading process.

Figure 9:
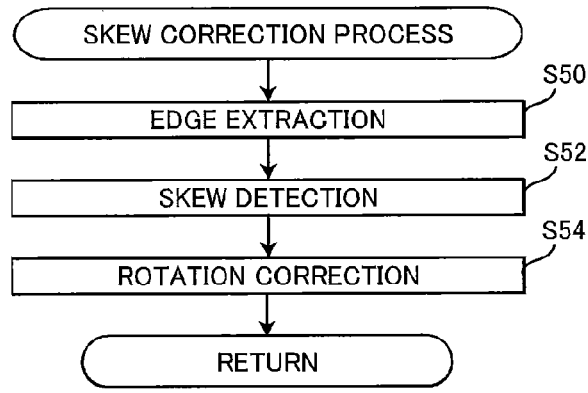
FIG. 9 is a flowchart showing a skew correction process in S36 of FIG. 7 and in S44 of FIG. 8.

FIG. 9 illustrates steps in the skew correction process. In S50 of FIG. 9, the CPU 11 first generates edge data from the scan data stored in the RAM 13 and extracts edge parts of the original scanning region, indicated by bold lines in FIG. 10, using this edge data and a prescribed threshold value. In S52 the CPU 11 determines whether the original scanning region is skewed relative to the conveying direction D2. When skew is detected, in S54 the CPU 11 corrects the rotation in the gradation data stored in the RAM 13. Common techniques known in the art may be used to implement processes for the edge extraction, skew detection, and rotation correction described above.

However, if the CPU 11 determines in S40 that the front sensor 25 is on (S40: YES), in S46 the CPU 11 monitors the rear sensor 26 to detect the position of the next sheet G being conveyed. In other words, the CPU 11 determines in S46 whether the rear sensor 26 has turned on and repeats the determination while the rear sensor 26 remains off (S46: NO). When the rear sensor 26 turns on (S46: YES), the CPU 11 sets both the leading-edge expanded width W1 and the trailing-edge expanded width W2 to the distance corresponding to the reference step number X in S48 and returns to the above process from S8.

On the other hand, if the CPU 11 determines that the rear sensor 26 has turned back on before the second step number was counted (S20: NO, S22: YES) as in the situation of FIG. 14, in S24 the CPU 11 calculates an interspace step number equivalent to the interspace Z between two sheets of the original. For example, the CPU 11 may calculate the interspace step number by subtracting the original-length step number stored in the RAM 13 from the step number counted after the rear sensor 26 was turned on by the first sheet G of the original until the rear sensor 26 was turned off by the passing of the first sheet G and turned back on by the next sheet G' of the original. In other words, the CPU 11 determines the interspace between the trailing edge of the first sheet G and a leading edge of a subsequently-conveyed sheet G'.

Figure 12:
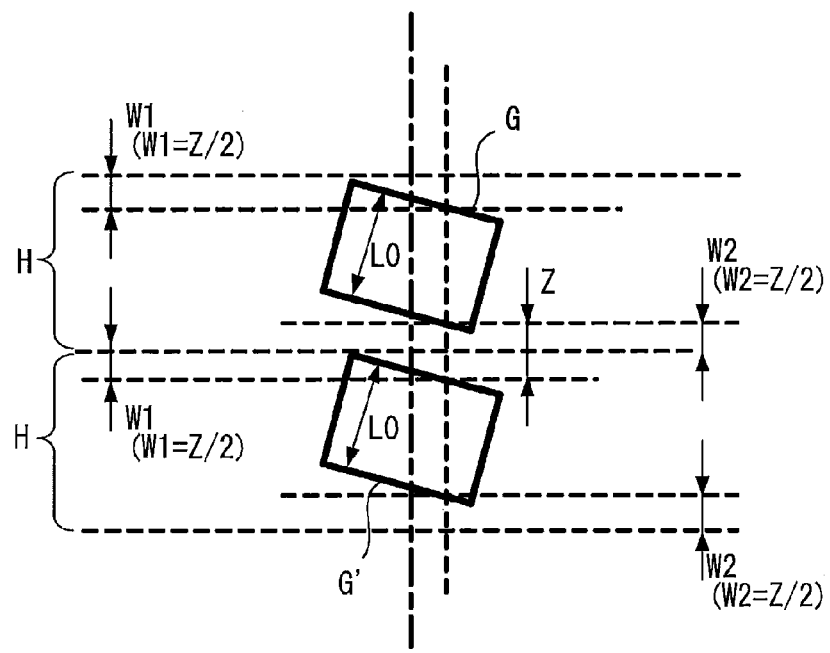
FIG. 12 is a schematic diagram explaining the scanning region and the sheets of the original conveyed continuously when the interspace between the sheets was shorter than twice the reference length and a reading-edge expanded width and a trailing-edge expanded width are updated.
Figure 13:
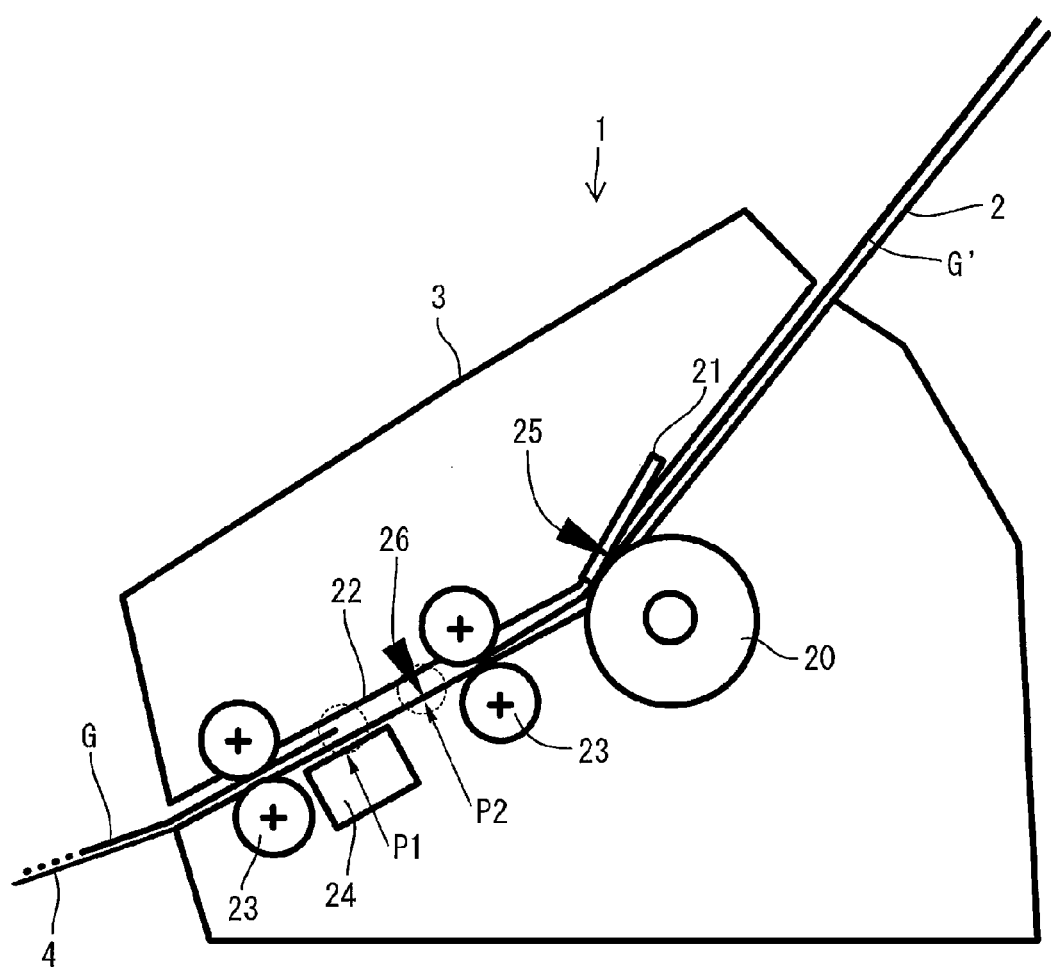
FIG. 13 is a schematic cross-sectional view showing the image reading device in a state where a rear sensor is turned off and a front sensor is turned on by the next sheet of the original.
Figure 14:
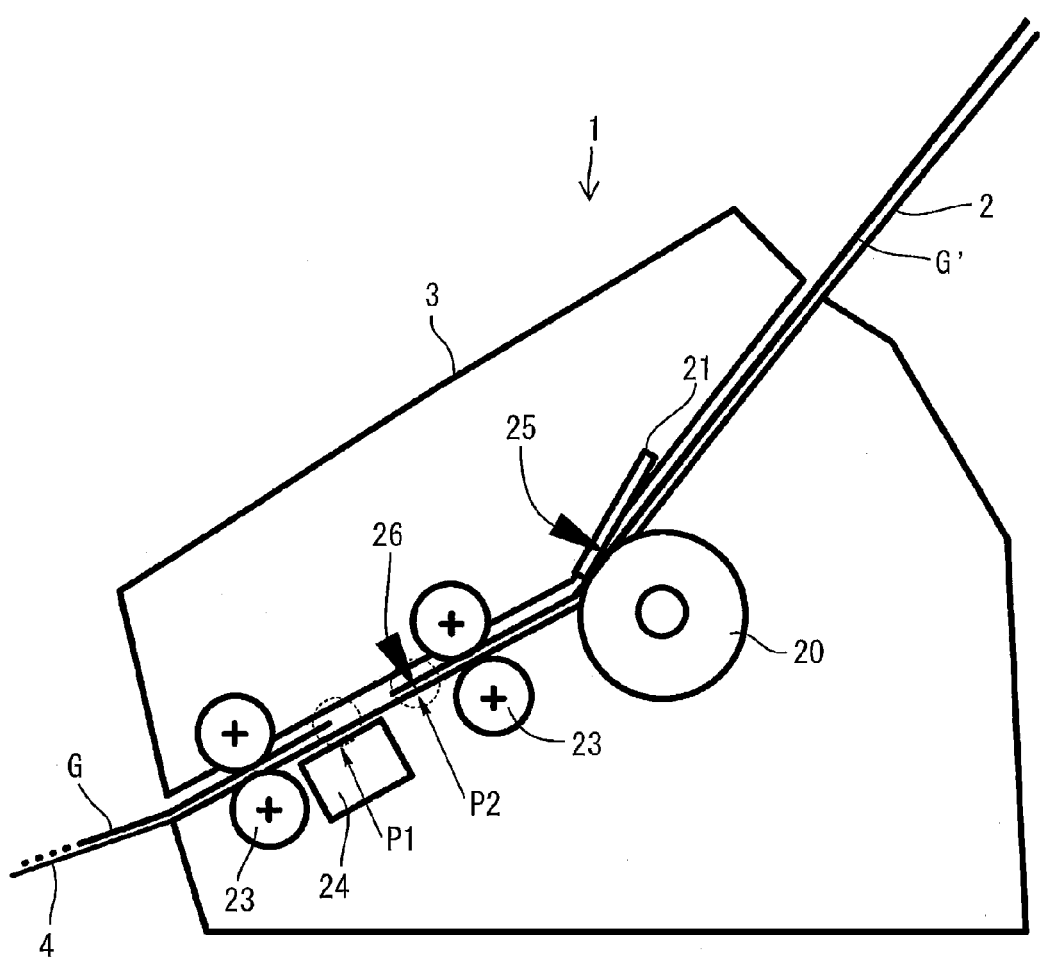
FIG. 14 is a schematic cross-sectional view showing the image reading device in a state where the rear sensor is turned on by the next sheet before a predetermined step number is counted since the rear sensor was turned off by a preceding sheet of the original.

In S26 the CPU 11 compares the interspace step number to 2X, i.e., twice the number of steps as the reference step number X. If the interspace step number is less than or equal to 2X (S26: YES), in S28 the CPU 11 resets and updates the leading-edge expanded width W1 and trailing-edge expanded width W2 based on the interspace step number. More specifically, the CPU 11 calculates a half-interspace step number by dividing the interspace step number in half and sets each of the leading-edge expanded width W1 and trailing-edge expanded width W2 to a distance corresponding to the half-interspace step number, as illustrated in FIG. 12. When the interspace step number is odd, the half-interspace step number is found after reducing the interspace step number by 1. After resetting the leading-edge expanded width W1 and trailing-edge expanded width W2, these values are used to recalculate the first and second step numbers.

However, when the interspace step number is greater than 2X (S26: NO), in S30 the CPU 11 maintains the settings for the leading-edge expanded width W1 and trailing-edge expanded width W2. That is, the CPU 11 sets both the leading-edge expanded width W1 and trailing-edge expanded width W2 to a distance corresponding to the reference step number X.

In S32 the CPU 11 waits until the second step number set in S28 or S30 has been counted after the rear sensor 26 turned off. In other words, the CPU 11 continually repeats the determination in S32 while the second step number has not elapsed (S32: NO). When the second step number has been counted (S32: YES), in S34 the CPU 11 stops reading the sheet G. In S36 the CPU 11 performs the skew correction process on the gradation data obtained earlier based on the read data read by the CIS 24, and subsequently returns to S8 to execute the process described above on the next conveyed sheet G.

6. Effects of the Embodiment (1) The image reading device 1 of the preferred embodiment forms the interspace Z between two sheets of the original based on the size L0 using the clutch mechanism 33 of the conveying unit 27. Accordingly, the CPU 11 can suppress overlap between consecutively conveyed sheets G of the original, without having to identify the size L0 prior to conveying the sheets G. On the other hand, the CPU 11 cannot set the leading-edge expanded width W1 and trailing-edge expanded width W2 based on the size L0 prior to conveying the sheets G. Accordingly, the leading-edge expanded width W1 and trailing-edge expanded width W2 may be set relatively large so as to prevent image loss due to skew in the sheets G, even when the size L0 is the maximum size that the image reading device 1 can convey, for example. As shown in FIG. 10, the interspace Z between two sheets of the original is wider than the sum of the leading-edge expanded width W1 and trailing-edge expanded width W2 when the size L0 is relatively large. Accordingly, when reading sheets G fed continuously, this technique can prevent the scanning region H of one sheet G from overlapping the scanning region H of the next sheet G, preventing image loss caused by such overlap.

Figure 11:
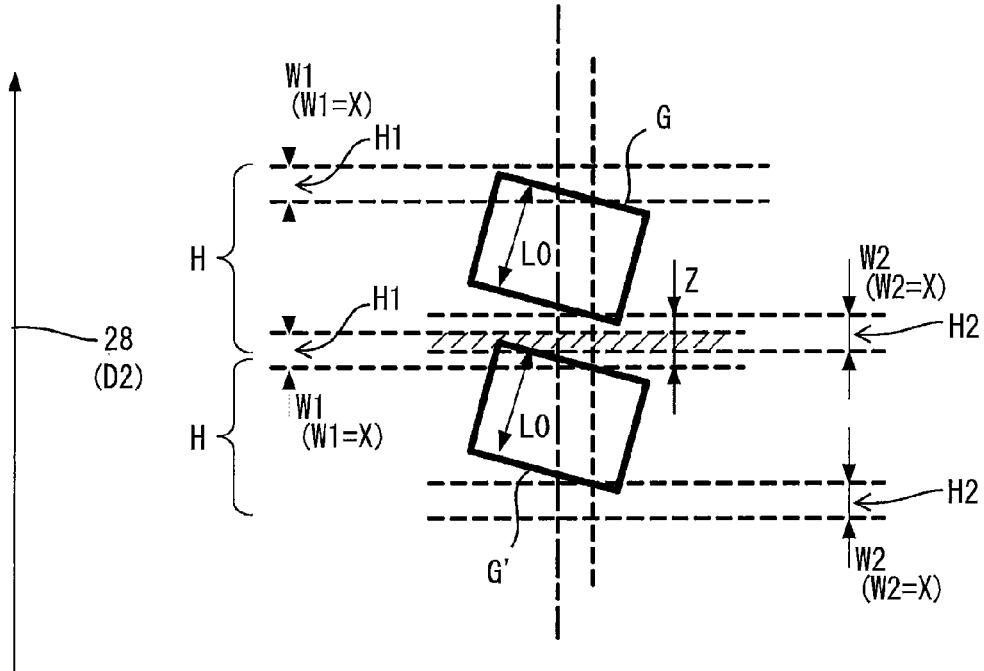
FIG. 11 is a schematic diagram explaining the scanning region and the sheets of the original conveyed continuously when the interspace between the sheets is shorter than twice the reference length.

On the other hand, when the size L0 is relatively small as in the example of FIG. 11, the interspace Z between the sheets of the original becomes narrower than the sum of the leading-edge expanded width W1 and trailing-edge expanded width W2. Accordingly, the scanning regions H in consecutive sheets will overlap (the overlapped portion is shaded in FIG. 11) when the image reading device 1 reads multiple sheets G of the original continuously. Thus, the scanning region H of the next sheet G of the original is effectively shrunk by an amount equivalent to the overlapping portion of the scanning regions H, leading to image loss in the scanning results for the next sheet G of the original.

However, the image reading device 1 according to the preferred embodiment can set the leading-edge expanded width W1 and trailing-edge expanded width W2 based on the interspace Z formed between the trailing edge of an original sheet G conveyed first and the leading edge of a sheet G' of the original conveyed next and can establish scanning regions H based on the leading-edge expanded width W1 and trailing-edge expanded width W2. By establishing the scanning region H of the sheet G of the original based on the interspace Z between two sheets of the original, the image reading device 1 of the preferred embodiment can prevent scanning regions H of sheets G from overlapping, thereby suppressing the occurrence of image loss.

(2) The image reading device 1 of the embodiment sets the leading-edge expanded width W1 and trailing-edge expanded width W2 based on the interspace Z between two sheets of the original when it is likely that scanning regions H of consecutively conveyed sheets G will overlap because the interspace Z between the sheets of the original is no greater than two times a distance equivalent to the reference step number X. In this way, the image reading device 1 can prevent overlap of scanning regions H. As shown in FIG. 12, the image reading device 1 divides the interspace Z between the sheets of the original in half, setting the leading-edge expanded width W1 and trailing-edge expanded width W2 to one half, respectively. Hence, if the amount that the leading edge of the sheet G protrudes into the leading-edge expanded width W1 or the trailing edge of the sheet G protrudes into the trailing-edge expanded width W2 is no greater than a half of the interspace Z between two sheets of the original, image loss can be prevented for both the preceding and succeeding sheets G conveyed consecutively.

(3) The image reading device 1 sets the leading-edge expanded width W1 and trailing-edge expanded width W2 to a distance equivalent to the reference step number X when the interspace Z between the sheets of the original is more than twice the distance equivalent to the reference step number X, as it is unlikely that scanning regions H will overlap in consecutively conveyed sheets G. In this way, the image reading device 1 need not determine the leading-edge expanded width W1 and trailing-edge expanded width W2 separately.

(4) In the image reading device 1 of the embodiment, the conveying unit 27 conveys the sheets G in steps. The image reading device 1 can monitor the position of sheets G by presetting a conveying speed and keeping track of the time during which the sheet G is conveyed, for example. However, the motor in the conveying unit 27 used to convey the sheets G can occasionally shut down due to a rise in temperature or the like. If the image reading device 1 detects when the sheet G arrives at a prescribed position based on conveyance time, the image reading device 1 will initiate reading of the sheet G after the conveyance time has elapsed, even when the sheet G has not actually been conveyed due to stoppage of the motor. In such cases, the sheet G will not be properly read. However, since the image reading device 1 of the embodiment detects when a sheet G of the original arrives at a prescribed position based on a step number indicating the distance that the sheet G was actually conveyed, rather than based on the conveyance time, the image reading device 1 can properly read the sheets G.

While the invention has been described in detail with reference to the embodiment thereof, it would be apparent to those skilled in the art that various changes and modifications may be made therein without departing from the spirit of the invention.

(1) While the present invention is described in the embodiment using the image-reading device 1, the invention is not limited to this embodiment. For example, the present invention may be applied to a multifunction peripheral having at least one of a printer function, a copier function, and a facsimile function for forming images, together with a scanner function.

(2) In the embodiment described above, the image-reading device 1 has a single ASIC 10, and the CPU 11 of the ASIC 10 for executing the reading process. However, the reading process may be executed by a plurality of CPUs, ASICs, and the like, for example. Further, the ASIC 10 in the embodiment includes the image-processing circuit 17 for executing the skew correction process in response to commands from the CPU 11, but the CPU 11 itself may execute the skew correction process.

(3) In the embodiment, the image-reading device 1 calculates the interspace step number by counting the number of steps from the moment the rear sensor 26 was turned on by a first sheet G of the original until the rear sensor 26 was turned off at the passing of the first sheet G and turned back on by the next sheet G and then subtracting the original-length step number stored in the RAM 13 from this step number. However, the image-reading device 1 may calculate the interspace step number by counting the number of steps from the moment that the rear sensor 26 was turned off at the passing of the first sheet G until the rear sensor 26 was turned back on by the next sheet G. In this case, it is not necessary to calculate the sheet-length step number from the moment that the rear sensor 26 turns on until the moment that the rear sensor 26 turns off.

What is claimed is:

1. An image reading device comprising:
   a conveying unit configured to convey a plurality of sheets one by one along a conveying path in a conveying direction, the conveying path having a reading position and a detection position upstream of the reading position in the conveying direction, each of the plurality of sheets having a leading edge and a trailing edge;
   a reading unit configured to read a sheet passing past the reading position, read data being acquired by the reading unit;
   a detecting unit configured to detect a sheet passing past the detection position; and
   a control unit configured to:
      control, based on a detection result of the detecting unit, the reading unit to start reading a sheet when the leading edge of the sheet reaches a position upstream of the reading position in the conveying direction by a first distance;
      control, based on the detection result of the detecting unit, the reading unit to stop reading the sheet when the trailing edge of the sheet reaches a position downstream of the reading position in the conveying direction by a second distance;
      determine an interspace between the trailing edge of the sheet and a leading edge of a subsequently-conveyed sheet that is conveyed subsequently to the sheet; and
      update the first distance and the second distance based on the interspace.

2. The image reading device according to claim 1, further comprising a tray on which the plurality of sheets are stacked;
   wherein the conveying unit comprises:
      a feeding roller configured to feed each of the plurality of sheets upon contacting the each of the plurality of sheets;
      a drive gear configured to drive the feeding roller at a first velocity;

a conveying roller configured to convey the sheet fed by the feeding roller at a second velocity faster than the first velocity;

a drive transmission portion configured to be circularly moved together with the rotation of drive gear; and a drive receiving portion configured to be circularly moved to rotate the feeding roller and engageable with and disengageable from the drive transmission portion, the drive receiving portion being engaged with the drive transmission portion so as to rotate the feeding roller at the first velocity when the leading edge of the sheet has not reached the conveying roller, the drive receiving portion being disengaged from the drive transmission portion so as to rotate the feeding roller at the second velocity by following a rotation of the conveying roller through the sheet when the sheet is spanning between the conveying roller and the feeding roller, the circular movement of the drive receiving portion being stopped when the trailing edge of the sheet is separated from the feeding roller and the drive receiving portion is disengaged from the drive transmission portion.

3. The image reading device according to claim 1, further comprising a correcting unit configured to perform a skew correction process on the read data acquired by the reading unit;

wherein the control unit updates the first distance and the second distance based on the interspace when the interspace is smaller than or equal to twice a reference distance, the reference distance being a distance required to perform the skew correction process on maximum-sheet read data by the correcting unit, the maximum-sheet read data being acquired when the image reading unit reads a maximum size of sheet that the conveying unit can convey.

4. The image reading device according to claim 3, wherein the control unit updates each of the first distance and the second distance to a half of the interspace when the interspace is smaller than or equal to twice the reference distance.

5. The image reading device according to claim 1, further comprising a correcting unit configured to perform a skew correction process on the read data read by the reading unit;

wherein the control unit updates each of the first distance and the second distance to a reference distance when the interspace is greater than twice the reference distance, the reference distance being a distance required to perform the skew correction process on maximum-sheet read data by the correcting unit, the maximum-sheet read data being acquired when the image reading unit reads a maximum size of sheet that the conveying unit can convey.

6. The image reading device according to claim 5, wherein the maximum-sheet read data is acquired when the image reading unit reads the maximum size of sheet that is conveyed in a maximum allowable skewed state.

* * * * *